UNITED STATES PATENT OFFICE.

DAVID G. WILLIAMS, OF BOSTON, MASSACHUSETTS.

IMPROVEMENT IN COMPOSITIONS FOR HEALING-PLASTERS.

Specification forming part of Letters Patent No. 116,906, dated July 11, 1871.

*To all whom it may concern:*

Be it known that I, DAVID G. WILLIAMS, of Boston, of the county of Suffolk and State of Massachusetts, have invented a new and useful Composition or Healing-Plaster for Wounds, &c.; and do hereby declare the same to be fully described as follows:

In carrying out my invention I take of the leaves of the *calendula* or garden-marigold about one-half a pound, and immerse the same in a jar or vessel containing about one quart of alcohol or water, and suffer the whole to remain together until the medicinal properties of the leaves may be properly extracted. To facilitate the extraction heat may be employed. Next, I prepare a compound solution of isinglass of the requisite strength—that is to say, I take two ounces of Cooper's fibrous isinglass and four ounces of unfibrous isinglass, and dissolve such in about one quart of water. Sometimes I employ a small amount of gelatine with the isinglass solution. After thus making the compound solution of isinglass or isinglass and gelatine I mix therewith about one gill of the solution of *calendula;* and, in order to complete the plaster, a sufficient quantity of the composition is to be spread, in one or more layers or coatings, upon a sheet of silk, linen, or cotton cloth, or other suitable fabric or flexile material.

I have discovered that the two kinds of isinglass above mentioned, when used as set forth, make a much better plaster than either will when employed without the other with the *calendula*, the fibrous isinglass serving to give a body to the composition not attainable with the other or unfibrous kind. The healing powers of the plaster appear also to be facilitated or improved by the use of the compound solution, as described.

I do not intend to confine my invention to the precise proportions of the ingredients of the composition as hereinbefore mentioned, as such may be varied somewhat without materially changing its medical character.

I claim as my invention—

The new manufacture or composition for a plaster, such being made of *calendula* and the compound solution of isinglass, in the manner and for application to a case substantially as set forth.

D. G. WILLIAMS.

Witnesses:
  R. H. EDDY,
  S. N PIPER.